(12) United States Patent
Kim et al.

(10) Patent No.: US 10,901,367 B2
(45) Date of Patent: Jan. 26, 2021

(54) IMAGE DATA PROCESSING METHOD AND APPARATUS

(71) Applicants: SAMSUNG ELECTRONICS CO., LTD., Suwon-si (KR); University of Seoul Industry Cooperation Foundation, Seoul (KR)

(72) Inventors: Yongkyu Kim, Hwaseong-si (KR); Kichul Kim, Seoul (KR); Hojung Kim, Suwon-si (KR); Hongseok Lee, Seongnam-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 550 days.

(21) Appl. No.: 15/819,656

(22) Filed: Nov. 21, 2017

(65) Prior Publication Data
US 2018/0150027 A1    May 31, 2018

(30) Foreign Application Priority Data

Nov. 30, 2016  (KR) .................. 10-2016-0162299

(51) Int. Cl.
*G03H 1/16*   (2006.01)
*G03H 1/00*   (2006.01)
*G03H 1/08*   (2006.01)
*G03H 1/04*   (2006.01)

(52) U.S. Cl.
CPC ......... *G03H 1/0005* (2013.01); *G03H 1/0808* (2013.01); *G03H 1/0866* (2013.01);
(Continued)

(58) Field of Classification Search
CPC .. G03H 1/0005; G03H 1/0808; G03H 1/0866; G03H 1/16; G03H 1/22; G03H 2001/0088; G03H 2001/045–0458; G03H 2001/0452; G03H 2001/0833; G03H 2210/454; G03H 2210/441; G03H 2226/02; G03H 2226/05; G03H 1/2294; G03H 2227/02; G03H 1/08; G03H 2001/0883; G03H 2210/33; G06F 1/00; G06F 1/02; G06F 1/03; G06F 1/0321; G06F 1/035; G06F 1/025; G06F 1/0353; G06F 3/00; G06F 3/01; G06F 3/011; G06F 3/012; G06F 3/013; G06F 7/00–785; G06F 7/44; G06F 7/464; G06F 3/017; G06F 3/005;
(Continued)

(56) References Cited

U.S. PATENT DOCUMENTS 5,748,793 A * 5/1998 Sanpei ................ G06T 3/4023
                                          375/240.03
5,956,755 A * 9/1999 Kanie ................. G06F 12/0292
                                          710/26
(Continued)

FOREIGN PATENT DOCUMENTS

JP        4191419 B2    12/2008
JP        2012-8220 A    1/2012

*Primary Examiner* — Stephone B Allen
*Assistant Examiner* — Jyotsna V Dabbi
(74) *Attorney, Agent, or Firm* — Sughrue Mion, PLLC

(57) ABSTRACT

A method of obtaining a focus term by using a periodicity of the focus term is provided. The focus term may be used in a plurality of operation processes for processing image data.

18 Claims, 15 Drawing Sheets

(52) U.S. Cl.
CPC ....... *G03H 1/16* (2013.01); *G03H 2001/0088* (2013.01); *G03H 2001/045* (2013.01); *G03H 2001/0452* (2013.01); *G03H 2001/0833* (2013.01); *G03H 2001/0883* (2013.01); *G03H 2210/454* (2013.01); *G03H 2226/02* (2013.01)

(58) Field of Classification Search
CPC .......... G06F 3/0346; G06G 7/16; G06G 7/19; G02B 30/26; G02B 30/50; G02B 30/52; G02B 30/00; G06T 19/006; G06T 2207/10028; G06Q 30/0261; H04N 1/00005; H04N 1/3216; H04N 13/366; H04N 13/395; H04N 13/128; H04N 2201/328; H04N 2201/3274; H04N 2201/3225
USPC ......................................................... 359/29
See application file for complete search history.

(56) References Cited

U.S. PATENT DOCUMENTS

| | | |
|---|---|---|
| 2009/0083355 A1 | 3/2009 | Takemori |
| 2009/0290203 A1* | 11/2009 | Schwerdtner ........ G03H 1/0005 359/9 |
| 2009/0322738 A1 | 12/2009 | Cable |
| 2016/0223987 A1* | 8/2016 | Park ..................... G03H 1/0486 |
| 2017/0091916 A1 | 3/2017 | Kim et al. |

\* cited by examiner

| 1200 | 1201 | 1202 | 1203 | 1204 |
|---|---|---|---|---|
| PERIOD | 0~1/4 PERIOD | 1/4~2/4 PERIOD | 2/4~3/4 PERIOD | 3/4~4/4 PERIOD |
| HIGH ORDER 2 BITS OF ADDRESS | 00 | 01 | 10 | 11 |
| Focus term data ROM output | real | -imaginary | -real | imaginary |
| | imaginary | real | -imaginary | -real |

1205
1206

IMAGE DATA PROCESSING METHOD AND APPARATUS

CROSS-REFERENCE TO RELATED APPLICATION

This application claims priority from Korean Patent Application No. 10-2016-0162299, filed on Nov. 30, 2016, in the Korean Intellectual Property Office, the disclosure of which is incorporated herein in its entirety by reference.

BACKGROUND

1. Field

Apparatuses and methods consistent with exemplary embodiments relate to image data processing.

2. Description of the Related Art

In recent years, many studies have been made regarding three-dimensional (3D) image-related technology. Also, devices for implementing high-quality holograms in real time by using a complex spatial light modulator (SLM) capable of controlling the amplitude and phase of light at the same time have been studied actively.

Computer-generated holograms (CGH) have recently been used to reproduce holographic moving images. Image data processing apparatuses are used to calculate hologram values for respective positions on a hologram plane, which requires a huge number of computations. Image data processing apparatuses according to some technologies need to perform a complicated operations such as Fourier transforms, in order to express a point in a space.

An image data processing apparatus such as a television (TV), a mobile device, or the like, may process image data to reproduce holographic images. In these cases, an image data processing apparatus may perform a Fourier transform on image data and reproduce an image based on transformed data.

When image data processing is performed, a significant amount of time is required due to quite the large amount of computations. In particular, as portable devices such as mobile devices, have limited size and limited available power, there is a need for methods of reducing the amount of computations and time required for performing image data processing.

SUMMARY

One or more exemplary embodiments may provide methods and apparatuses for processing image data by using a small memory.

Additional exemplary aspects and advantages will be set forth in part in the description which follows and, in part, will be apparent from the description, or may be learned by practice of the presented exemplary embodiments.

According to an aspect of an exemplary embodiment, an image data processing method includes: obtaining a coordinate value of a hologram image corresponding to a location of a pupil; obtaining a reference constant which corresponds to the obtained coordinate value; obtaining a focus term which is a constant that is used in focusing of the hologram image, by updating a phase of the reference constant according to a section, from among a plurality of predetermined sections, including the obtained coordinate value; and obtaining image data which is used in display of the hologram image, by performing an operation using the focus term, and storing the image data.

According to an aspect of another exemplary embodiment, an image data processing apparatus includes: a memory and a processor configured to execute software instructions and thereby obtain a coordinate value of a hologram image corresponding to a location of a pupil, obtain a reference constant which corresponds to the obtained coordinate value, obtain a focus term which is a constant that is used in focusing of the hologram image, by updating a phase of the reference constant according to a section, from among a plurality of predetermined sections, including the obtained coordinate value, and obtain image data which is used in display of the hologram image, by performing an operation using the focus term; wherein the memory is configured to store the obtained image data.

According to an aspect of another exemplary embodiment, there is provided a non-transitory computer-readable recording medium having recorded thereon a program for performing, when executed by a computer, the above image data processing method.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to exemplary embodiments presented only for illustration, with reference to the accompanying drawings. The exemplary embodiments are merely described below to explain aspects and are not intended to limit the scope of claims. What one of ordinary skill in the art may easily infer from the detailed description and the exemplary embodiments is construed as being included in the scope of claims.

The terms "composed of" or "include" used herein should not be construed as including all of various elements or operations described in the specification, and should be construed as not including some of the various elements or operations or as further including additional elements or operations.

While such terms as "first" and "second" may be used herein to describe various elements, such elements must not be limited to the above terms. The above terms are used only to distinguish one element from another.

As used herein, the term "and/or" includes any and all combinations of one or more of the associated listed items. Expressions such as "at least one of," when preceding a list of elements, modify the entire list of elements and do not modify the individual elements of the list.

The present exemplary embodiments relate to rendering methods and apparatuses, and detailed descriptions of information widely known to one of ordinary skill in the art to which the exemplary embodiments described below pertain are omitted.

Hereinafter, exemplary embodiments will be described in detail with reference to the accompanying drawings.

Figure 1:
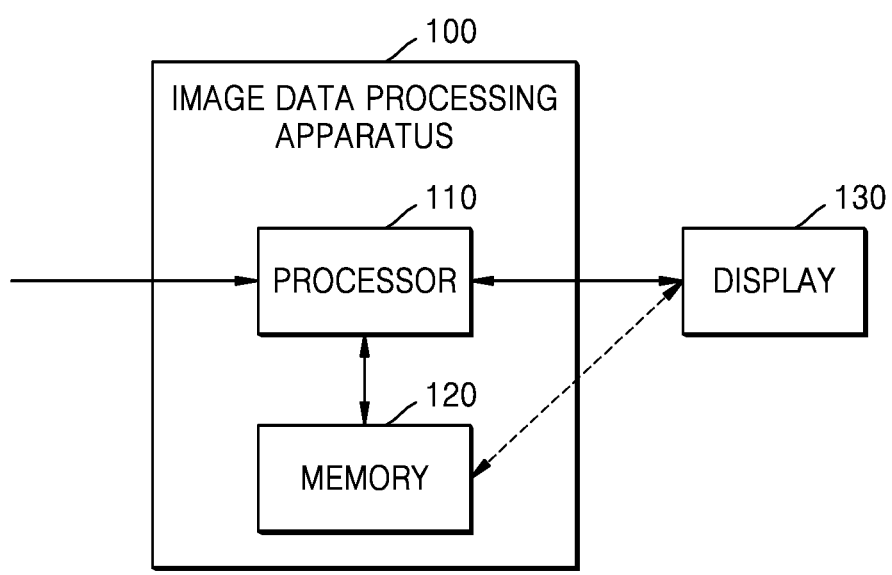
FIG. 1 is a block diagram of configurations of an image data processing apparatus according to an exemplary embodiment.

FIG. 1 is a block diagram of configurations of an image data processing apparatus 100 according to an exemplary embodiment. It will be understood by one of ordinary skill in the art that other general elements may be further included in addition to the elements illustrated in FIG. 1.

Referring to FIG. 1, the image data processing apparatus 100 may include a processor 110 and a memory 120. Alternatively, the image data processing apparatus 100 may include a display 130. The display 130 may receive data from the processor 110 and display an image. Alternatively, the display 130 may display an image by using data directly received from the memory 120 according to a command of the processor 110.

The processor 110 according to an exemplary embodiment may perform a layer-based algorithm. The processor 110 may perform calculations by splitting a reproduction region of a hologram into layers based on depth. The processor 110 may perform a fast Fourier transform (FFT) or an inverse fast Fourier transform (IFFT) on each split layer. For example, the processor 110 may obtain data regarding one pixel of a hologram image by performing the FFT twice.

A coordinate value according to an exemplary embodiment may vary according to a criterion. Accordingly, even coordinate values corresponding to the same pixel may be different according to the criterion. For example, when a coordinate value of a hologram image corresponding to a location of the display 130 is a first coordinate value (x1, y1), a coordinate value of the hologram image corresponding to a location of a pupil of a viewer is a second coordinate value (u, v), and a coordinate value of the hologram image corresponding to a location of the retina of a viewer is a third coordinate value (x2, y2), the first coordinate value (x1, y1), the second coordinate value (u, v), and the third coordinate value (x2, y2), all corresponding to the same pixel, may be different from one another.

The processor 110 according to an exemplary embodiment may use a focus term to perform the FFT twice. The focus term according to an exemplary embodiment may be used in focusing related to a hologram image. The processor 110 may perform a first Fourier transform, which is the FFT regarding a section from the display 130 to the pupil. Also, the processor 110 may perform a second Fourier transform, which is the FFT regarding a section from the pupil to the retina. The processor 110 may use a value obtained by multiplying a result of performing the first Fourier transform by the focus term as an input of the second Fourier transform. The focus term according to an exemplary embodiment may be obtained from a lookup table. For example, the processor 110 may load the focus term corresponding to the second coordinate value (u, v) from a lookup table stored in the memory 120.

The focus term according to an exemplary embodiment may have periodicity. For example, the focus term may have periodicity according to a change in a square of a distance of the second coordinate value ($u^2+v^2$). For example, the focus term may be sinusoidal according to a change in the square of the distance of the second coordinate value ($u^2+v^2$).

The memory 120 according to an exemplary embodiment may store therein data regarding a portion of the entire period of the focus term. For example, the memory 120 may have data stored therein regarding ¼ of the period of the focus term.

The processor 110 according to an exemplary embodiment may obtain a constant corresponding to the second coordinate value (u, v) from the memory 120 in which data is stored regarding a portion of the entire period of the focus term. A reference constant according to an exemplary embodiment may include a constant corresponding to the second coordinate value (u, v) from among a plurality of constants stored in the memory 120, in which data regarding a portion of the entire period of the focus term is stored. For example, the reference constant may be a constant corresponding to the second coordinate value (u, v) from among constants that may be the focus term within ¼ of the period of the focus term. In this case, the same reference constant may correspond to four different second coordinate values (u, v).

A method of decreasing an amount of memory which is allocated to the focus term by using the periodicity of the focus term will be described.

Figure 2:
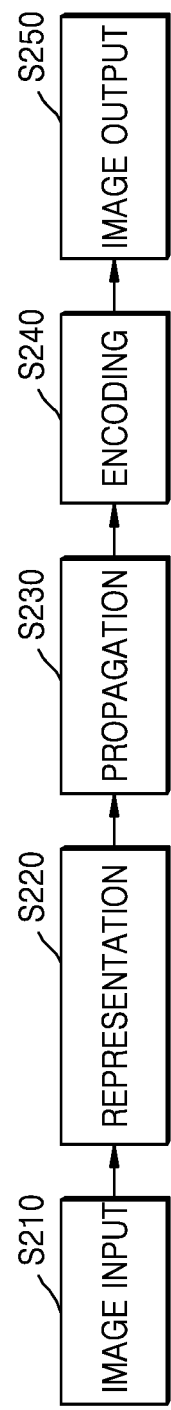
FIG. 2 is a flowchart of a process of processing image data via the image data processing apparatus according to an exemplary embodiment.

FIG. 2 is a flowchart of a process of processing image data via the image data processing apparatus 100 according to an exemplary embodiment. Referring to FIG. 2, the image data processing apparatus 100 may receive image data and may output an image corresponding to the received image data.

In operation S210, the image data processing apparatus 100 receives image data. For example, when a layer-based algorithm is applied to image data in a computer-generated holography (CGH) operation, the image data may be color data (or a color image), depth data (or a depth image), etc. The color data may be data indicating a plurality of colors for each layer. For example, the color data may be at least one of red data, blue data, and green data. The layer-based algorithm is a method of processing data of each split plane by splitting a reproduction region of a hologram into split planes/layers based on depth. The image data processing apparatus 100 may perform a Fourier transform or an inverse Fourier transform on data of each split plane during a process of generating or displaying a hologram image.

In operation S220, the image data processing apparatus 100 may change a form of the image data received in operation S210 in order to perform propagation in operation S230. For example, the image data processing apparatus 100 may perform normalization on data received in operation S210. For example, the image data processing apparatus 100 may match green data with one value from among 0~255 received in operation S210 to one value from among 0~1.

Alternatively, the image data processing apparatus 100 may perform image quality compensation and a field operation in operation S220. The image data processing apparatus 100 may compensate image data to improve image quality of the image data.

In operation S230, the image data processing apparatus 100 may perform a Fourier transform, a FFT, an inverse Fourier transform, or an IFFT.

For example, the image data processing apparatus 100 may perform a Fourier transform on image data in the form of a two-dimensional (2D) matrix. The image data processing apparatus 100 may perform a one-dimensional (1D) Fourier transform twice for a 2D Fourier transform. The image data processing apparatus 100 may perform a 1D Fourier transform on the image data in a row direction, and may perform a 1D Fourier transform on transformed image data in a column direction. The image data processing apparatus 100 generates a holographic image via the Fourier transform.

As another example, the image data processing apparatus 100 may use a focus term during a process of performing a Fourier or inverse Fourier transform a plurality of times. For example, the image data processing apparatus 100 may perform a first FFT and may use a result obtained by multiplying a result of the first FFT by the focus term as an input of a second FFT. As another example, the image data processing apparatus 100 may perform a first IFFT and may use a result obtained by multiplying a result of the first IFFT by the focus term as an input of a second IFFT.

In operation S240, the image data processing apparatus 100 may perform encoding. For example, the image data processing apparatus 100 generates data that is to be inputted to a screen via pixel encoding.

In operation S250, the image data processing apparatus 100 outputs an image via a display. The display may broadly refer to any apparatus for displaying an image.

According to one or more exemplary embodiments, the amount of data required to be stored in the memory, in order to obtain the focus term in operation S230 in which many operations are performed, may be decreased. For example, the amount of data regarding the focus term may be decreased by using periodicity of the focus term corresponding to a coordinate value. In this case, according to an exemplary embodiment, the amount of data regarding the focus term may be further decreased by using symmetry (for example, vertical axis symmetry, point symmetry, etc.) within the periodicity of the focus term.

Figure 3:
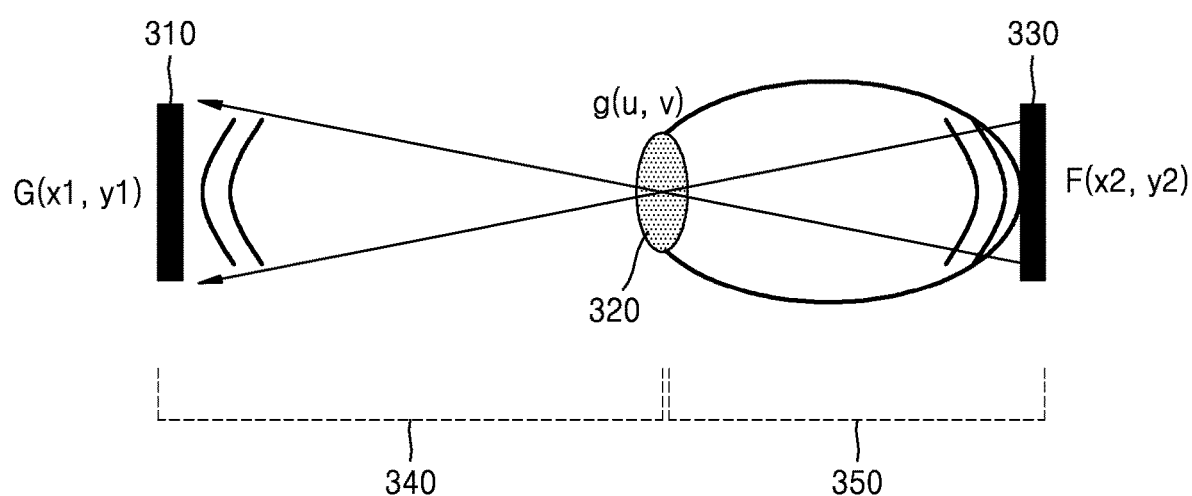
FIG. 3 illustrates a method of performing an operation regarding image data via the image data processing apparatus according to an exemplary embodiment.

FIG. 3 illustrates a method of performing an operation regarding image data via the image data processing apparatus 100 according to an exemplary embodiment. In detail, an operation of image data which is performed during a process in which an image displayed on a display 310 is recognized at a retina 330 via a pupil 320 will be described below.

The image data processing apparatus 100 according to an exemplary embodiment may perform a Fourier transform or an inverse Fourier transform a plurality of times during a process of processing a hologram image.

For example, the image data processing apparatus 100 may perform a first Fourier transform, which is a Fourier transform regarding a first section 340, which is a section from the display 310 to the pupil 320. Alternatively, the image data processing apparatus 100 may perform a first inverse Fourier transform, which is an inverse Fourier transform regarding the first section 340.

As another example, the image data processing apparatus 100 may perform a second Fourier transform, which is a Fourier transform regarding a second section 350, which is a section from the pupil 320 to the retina 330. Alternatively, the image data processing apparatus 100 may perform a second inverse Fourier transform, which is an inverse Fourier transform regarding the second section 350.

The image data processing apparatus 100 according to an exemplary embodiment may use a focus term during the process of performing the Fourier transform or the inverse Fourier transform a plurality of times.

For example, a calculation result of a value obtained via the first Fourier transform and the focus term may be used as an input of the second Fourier transform. For example, the image data processing apparatus 100 may perform the second Fourier transform by applying a value obtained by multiplying the value obtained via the first Fourier transform by the focus term as an input of the second Fourier transform. Also, a pixel value used for the hologram image may be determined by using data obtained via the second Fourier transform.

As another example, a calculation result of a value obtained via the first inverse Fourier transform and the focus term may be used as an input of the second inverse Fourier transform. For example, the image data processing apparatus 100 may perform the second inverse Fourier transform by applying a value obtained by multiplying the value obtained via the first inverse Fourier transform and the focus term as an input of the second inverse Fourier transform.

The Fourier transform described herein may include an FFT, and the inverse Fourier transform described herein may include an IFFT.

A coordinate value according to an exemplary embodiment may vary according to a criterion. Accordingly, even coordinate values corresponding to the same pixel may be different according to the criterion. For example, when a coordinate value of the hologram image corresponding to a location of the display 310 is a first coordinate value (x1, y1), a coordinate value of the hologram image corresponding to a location of the pupil 320 is a second coordinate value (u, v), and a coordinate value of the hologram image corresponding to a location of the retina 330 is a third coordinate value (x2, y2), the first coordinate value (x1, y1), the second coordinate value (u, v), and the third coordinate value (x2, y2) corresponding to the same pixel may be different from one another.

The focus term may be determined according to the second coordinate value (u, v). For example, the focus term may be expressed as [Equation 1].

$$\text{Focus\_Term}(u, v) = e^{-j\frac{\pi}{\lambda}\left(\frac{1}{d_1}+\frac{1}{d_2}-\frac{1}{f}\right)(u^2+v^2)} \quad \text{[Equation 1]}$$

The focus term according to an exemplary embodiment may be determined according to the second coordinate value (u, v), and the focus term according to the second coordinate value (u, v) may be expressed as [Equation 1].

Also, in [Equation 1], $\lambda$ may denote a wavelength, $d_1$ and $d_2$ may each denote a distance, and f may denote a focal length.

Also, the image data processing apparatus 100 according to an exemplary embodiment may process image data by using the focus term. In detail, an example of performing an operation in order to obtain image data will be described through [Equation 2].

$$G(x_1, y_1) = \frac{(i)(j)}{(\lambda d_1)(\lambda d_2)} e^{-j\frac{\pi}{\lambda d_1}(x_1^2+y_1^2)}$$
$$\int\int \left[ e^{-j\frac{\pi}{\lambda}\left(\frac{1}{d_1}+\frac{1}{d_2}-\frac{1}{f}\right)(u^2+v^2)} e^{j\frac{2\pi}{\lambda d_1}(ux_1+vy_1)} \right.$$
$$\left. \int\int e^{-j\frac{\pi}{\lambda d_2}(x_2^2+y_2^2)} F\{x_2, y_2\} e^{j\frac{2\pi}{\lambda d_2}(x_2u+y_2v)} dx_2 dy_2 \right]$$
$$dudv \quad \text{[Equation 2]}$$

As seen in [Equation 2], the image data processing apparatus 100 may obtain image data according to the first coordinate value (x1, y1) via an operation using the focus term.

When $$-\frac{\pi}{\lambda}\left(\frac{1}{d_1}+\frac{1}{d_2}-\frac{1}{f}\right)$$

is substituted with c, which is a constant, in the focus term of [Equation 1], the focus term may be expressed as $e^{jc(u^2+v^2)}$. Also, when $c(u^2+v^2)$ is substituted with $\theta$, the focus term may be expressed as [Equation 3].

$$e^{j\theta} = \cos\theta + j\sin\theta \quad \text{[Equation 3]}$$

As seen in [Equation 3], the focus term may be expressed by using $\theta$ regarding a partial section because the focus term has periodicity. For example, in [Equation 4], the focus term may be expressed by using $\theta$ having a value within the section $0 \le \theta < \pi/2$.

$$\text{In the case of } 0 \le \theta < \frac{\pi}{2}, \quad \text{[Equation 4]}$$

-continued
$$e^{j\theta} = \cos\theta + j\sin\theta$$
$$e^{j\left(\frac{\pi}{2}+\theta\right)} = \cos\left(\frac{\pi}{2}+\theta\right) + j\sin\left(\frac{\pi}{2}+\theta\right) = -\sin\theta + j\cos\theta$$
$$e^{j(\pi+\theta)} = \cos(\pi+\theta) + j\sin(\pi+\theta) = -\cos\theta - j\sin\theta$$
$$e^{j\left(\frac{3\pi}{2}+\theta\right)} = \cos\left(\frac{3\pi}{2}+\theta\right) + j\sin\left(\frac{3\pi}{2}+\theta\right) = \sin\theta - j\cos\theta$$

Periodicity of the focus term described above through [Equation 1] to [Equation 4] will be described with graphs in FIGS. 5 to 8.

As seen in [Equation 4], the focus term may have periodicity. Also, as seen in [Equation 4], the focus term regarding the entire period may be determined by using only the focus term regarding ¼ of the period. Accordingly, the image data processing apparatus 100 according to an exemplary embodiment may obtain the focus term in the entire section by using data of the focus term regarding a partial period.

Figure 4:
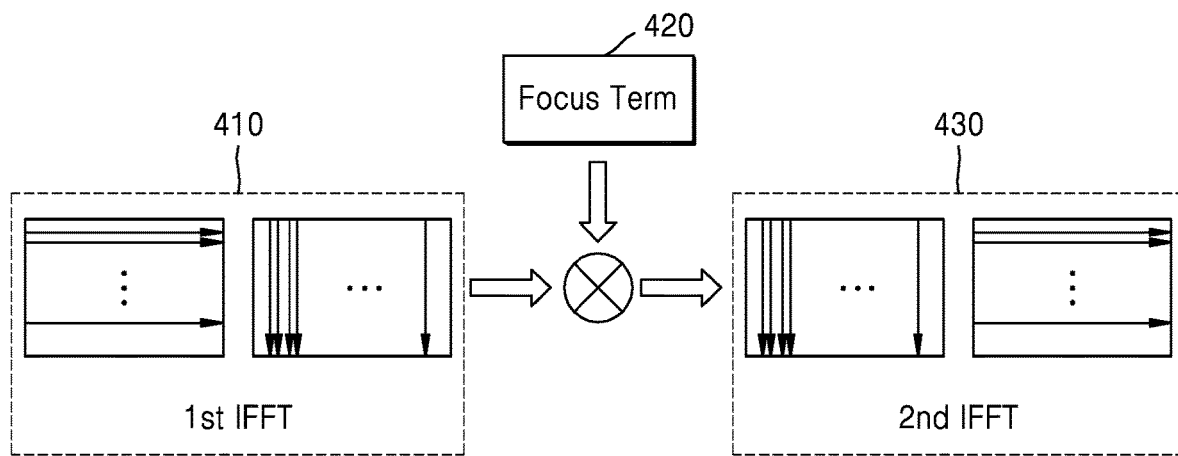
FIG. 4 illustrates a method of processing image data via the image data processing apparatus according to an exemplary embodiment by performing a Fourier transform a plurality of times or performing an inverse Fourier transform a plurality of times.

FIG. 4 illustrates a method of processing image data via the image data processing apparatus 100 according to an exemplary embodiment by performing a Fourier transform a plurality of times or performing an inverse Fourier transform a plurality of times.

The Fourier transform or the inverse Fourier transform may be performed in a horizontal direction or a vertical direction. Referring to FIG. 4, the image data processing apparatus 100 may perform a 1D FFT or IFFT twice on image data during an image data processing process. For example, the image data processing apparatus 100 may generate first data by performing a 1D FFT 410 once on image data in a column direction, and may generate second data by performing a 1D FFT 430 once on a value obtained by multiplying the first data by a focus term 420 in a row direction. The second data according to an exemplary embodiment may be data obtained by performing a 1D FFT on inputted image data in each of the column direction and the row direction. As another example, the image data processing apparatus 100 may generate third data by performing a 1D IFFT 410 once on image data in a column direction, and may generate fourth data by performing a 1D IFFT 430 once on a value obtained by multiplying the third data by a focus term 420 in a row direction.

Figure 5:
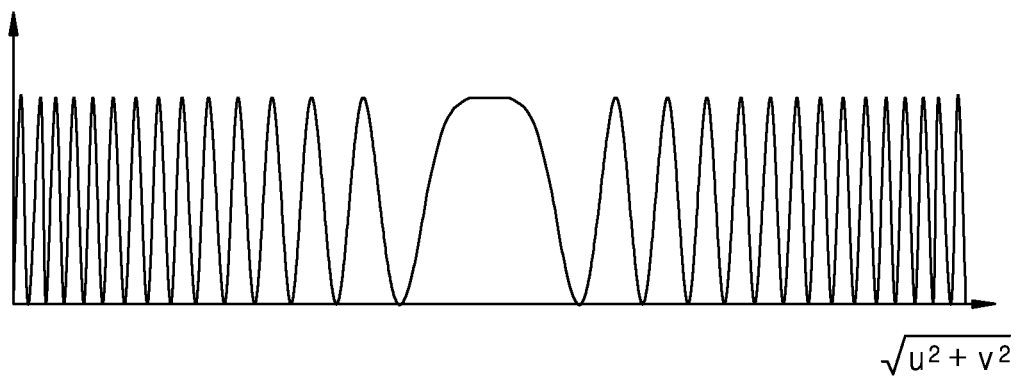
FIG. 5 illustrates a value corresponding to a real number part of a focus term that is used in a process of processing image data via the image data processing apparatus according to an exemplary embodiment, according to a change in a distance of a coordinate from the origin.

FIG. 5 illustrates a value corresponding to a real number part of a focus term that is used in a process of processing image data via the image data processing apparatus 100 according to an exemplary embodiment, according to a change in a distance of a coordinate from the origin.

FIG. 5 illustrates an example of a real number of a focus term according to a change in a distance ($\sqrt{u^2+v^2}$) of a second coordinate value.

Referring to FIG. 5, when a coordinate value of a hologram image corresponding to a location of the pupil is a second coordinate value (u, v), the real number of the focus term according to a change in the distance ($\sqrt{u^2+v^2}$) of the second coordinate value is illustrated. In the graph illustrated in FIG. 5, the horizontal axis denotes the distance ($\sqrt{u^2+v^2}$) of the second coordinate value and the vertical axis denotes the real number of the focus term.

As seen in [Equation 1], the focus term may include both real and imaginary numbers.

The real number of the focus term or the distance ($\sqrt{u^2+v^2}$) of the second coordinate value at a point where the horizontal axis and the vertical axis meet each other may be a predetermined value. For example, the real number of the focus term or the distance ($\sqrt{u^2+v^2}$) of the second coordinate value at a point where the horizontal axis and the vertical axis meet each other may be a constant other than 0.

As seen in FIG. 5, the real number of the focus term according to a change in the distance ($\sqrt{u^2+v^2}$) of the second coordinate value may have the form of an aperiodic function.

Figure 6:
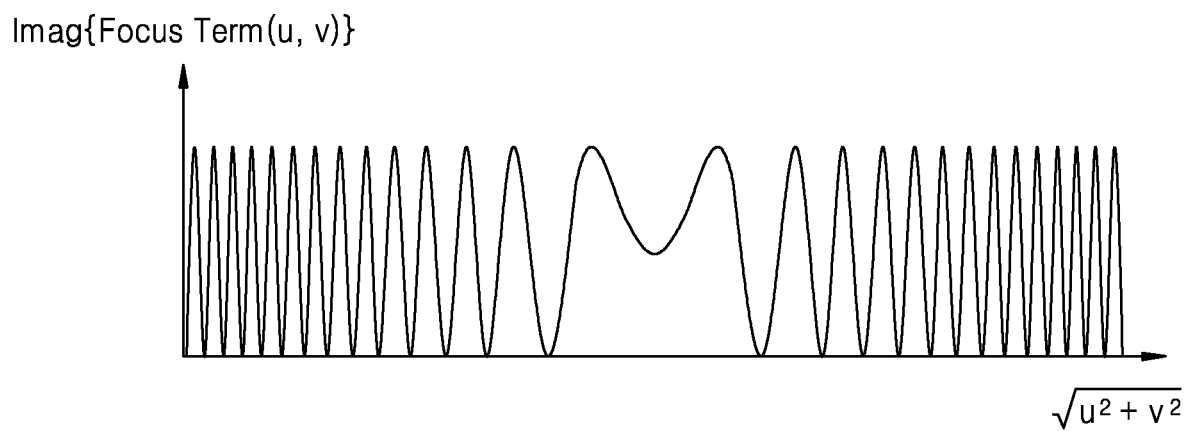
FIG. 6 illustrates a value corresponding to an imaginary number part of a focus term that is used in a process of processing image data via the image data processing apparatus according to an exemplary embodiment, according to a change in a distance of a coordinate from the origin.

FIG. 6 illustrates a value corresponding to an imaginary number part of a focus term that is used in a process of processing image data via the image data processing apparatus 100 according to an exemplary embodiment, according to a change in a distance of a coordinate from the origin.

FIG. 6 illustrates an example of an imaginary number of a focus term according to a change in a distance ($\sqrt{u^2+v^2}$) of a second coordinate value.

Referring to FIG. 6, when a coordinate value of a hologram image corresponding to a location of the pupil is a second coordinate value (u, v), the imaginary number of the focus term according to a change in the distance ($\sqrt{u^2+v^2}$) of the second coordinate value is illustrated. In the graph illustrated in FIG. 6, the horizontal axis denotes the distance ($\sqrt{u^2+v^2}$) of the second coordinate value and the vertical axis denotes the imaginary number of the focus term.

As seen in [Equation 1], the focus term may include both real and imaginary numbers.

The imaginary number of the focus term or the distance ($\sqrt{u^2+v^2}$) of the second coordinate value at a point where the horizontal axis and the vertical axis meet each other may be a predetermined value. For example, the imaginary number of the focus term or the distance ($\sqrt{u^2+v^2}$) of the second coordinate value at a point where the horizontal axis and the vertical axis meet each other may be a constant other than 0.

As seen in FIG. 6, the imaginary number of the focus term according to a change in the distance ($\sqrt{u^2+v^2}$) of the second coordinate value may have the form of an aperiodic function.

Figure 7:
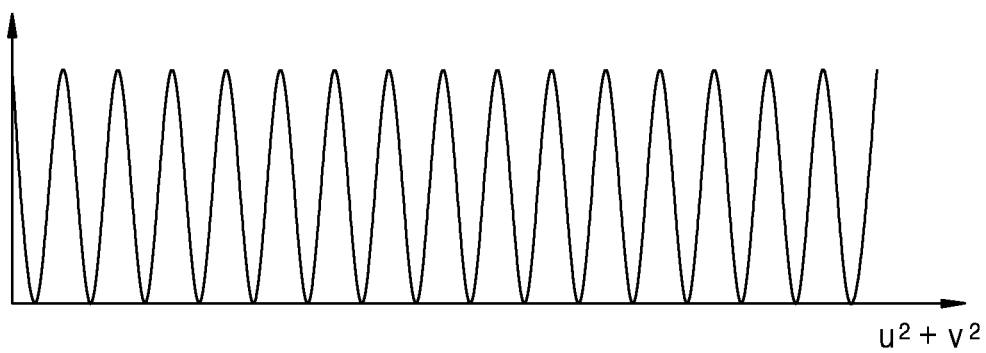
FIG. 7 illustrates a value corresponding to a real number part of a focus term that is used in a process of processing image data via the image data processing apparatus according to an exemplary embodiment, according to a change in a square of a distance of a coordinate from the origin.

FIG. 7 illustrates a value corresponding to a real number part of a focus term that is used in a process of processing image data via the image data processing apparatus 100 according to an exemplary embodiment, according to a change in a square of a distance of a coordinate from the origin.

FIG. 7 illustrates an example of a real number of a focus term according to a change in a square ($u^2+v^2$) of a distance of a second coordinate value.

Referring to FIG. 7, when a coordinate value of a hologram image corresponding to a location of the pupil is a second coordinate value (u, v), the real number of the focus term according to a change in the square ($u^2+v^2$) of the distance of the second coordinate value is illustrated. In the graph illustrated in FIG. 7, the horizontal axis denotes the square ($u^2+v^2$) of the distance of the second coordinate value and the vertical axis denotes the real number of the focus term.

As seen in [Equation 1], the focus term may include both real and imaginary numbers.

The real number of the focus term or the square ($u^2+v^2$) of the distance of the second coordinate value at a point where the horizontal axis and the vertical axis meet each other may be a predetermined value. For example, the real number of the focus term or the square ($u^2+v^2$) of the distance of the second coordinate value at a point where the horizontal axis and the vertical axis meet each other may be a constant other than 0.

As seen in FIG. 7, the real number of the focus term according to a change in the square ($u^2+v^2$) of the distance of the second coordinate value may have the form of a periodic function. Although the function illustrated in FIG. 5 is in the form of an aperiodic function, periodicity regarding a change in the real number of the focus term may be confirmed by changing a variable of the horizontal axis from the distance ($\sqrt{u^2+v^2}$) of the second coordinate value to the square ($u^2+v^2$) of the distance of the second coordinate value.

Figure 8:
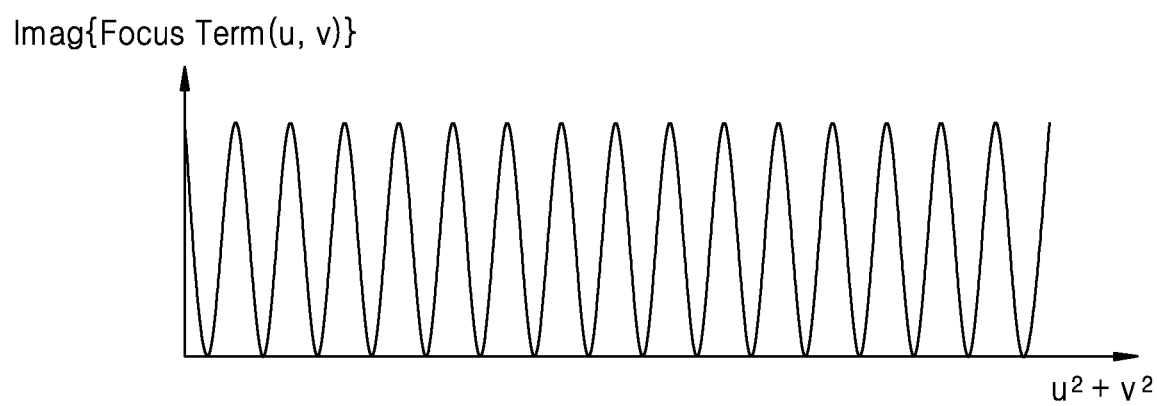
FIG. 8 illustrates a value corresponding to an imaginary number part of a focus term that is used in a process of processing image data via the image data processing apparatus according to an exemplary embodiment, according to a change in a square of a distance of a coordinate from the origin.

FIG. 8 illustrates a value corresponding to an imaginary number part of a focus term that is used in a process of processing image data via the image data processing apparatus 100 according to an exemplary embodiment, according to a change in a square of a distance of a coordinate from the origin.

FIG. 8 illustrates an example of an imaginary number of a focus term according to a change in a square ($u^2+v^2$) of a distance of a second coordinate value.

Referring to FIG. 8, when a coordinate value of a hologram image corresponding to a location of the pupil is a second coordinate value (u, v), the imaginary number of the focus term according to a change in the square ($u^2+v^2$) of the distance of the second coordinate value is illustrated. In the graph illustrated in FIG. 8, the horizontal axis denotes the square ($u^2+v^2$) of the distance of the second coordinate value and the vertical axis denotes the imaginary number of the focus term.

As seen in [Equation 1], the focus term may include both real and imaginary numbers.

The imaginary number of the focus term or the square ($u^2+v^2$) of the distance of the second coordinate value at a point where the horizontal axis and the vertical axis meet each other may be a predetermined value. For example, the imaginary number of the focus term or the square ($u^2+v^2$) of the distance of the second coordinate value at a point where the horizontal axis and the vertical axis meet each other may be a constant other than 0.

As seen in FIG. 8, the imaginary number of the focus term according to a change in the square ($u^2+v^2$) of the distance of the second coordinate value may have the form of a periodic function. Although the function illustrated in FIG. 6 is in the form of an aperiodic function, periodicity regarding a change in the imaginary number of the focus term may be confirmed by changing a variable of the horizontal axis from the distance ($\sqrt{u^2+v^2}$) of the second coordinate value to the square ($u^2+v^2$) of the distance of the second coordinate value.

Figure 9:
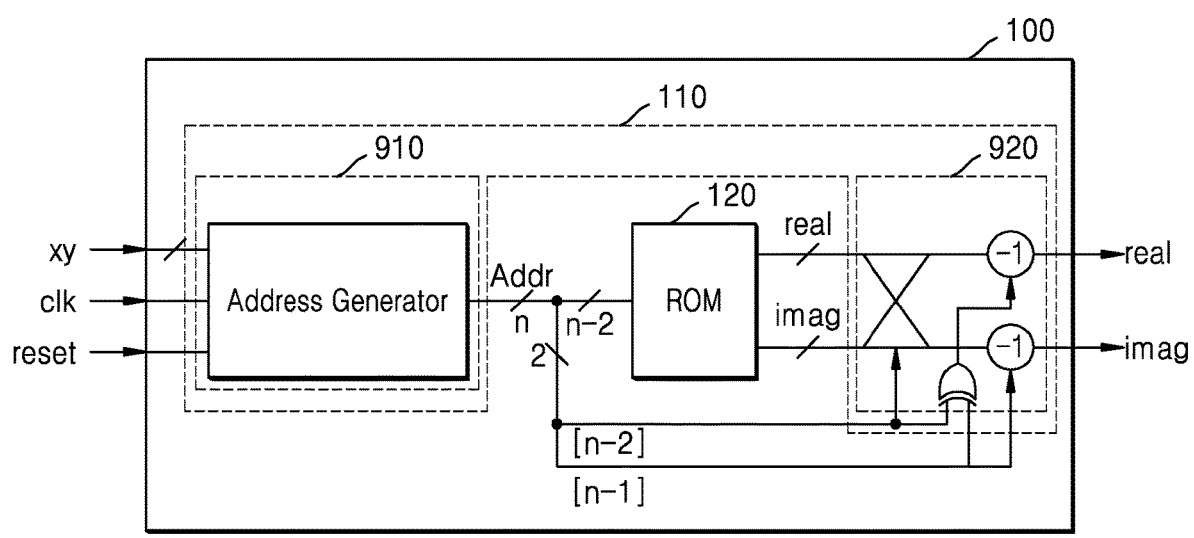
FIG. 9 is a block diagram of an exemplary embodiment in which the image data processing apparatus is implemented using address data.

FIG. 9 is a block diagram of an exemplary embodiment in which the image data processing apparatus 100 is implemented using address data.

It will be understood by one of ordinary skill in the art that other general elements may be further included in addition to the elements illustrated in FIG. 9.

Referring to FIG. 9, the image data processing apparatus 100 may include the processor 110 and the memory 120. Also, the processor 110 may include an address generator 910 and an updater 920.

The address generator 910 according to an exemplary embodiment may receive a coordinate value, a clock signal, a reset signal, etc. and output an address. For example, the address generator 910 may output an n-bit address corresponding to a received coordinate value. The address generator 910 according to an exemplary embodiment may receive a second coordinate value (u, v) which is a coordinate value of a hologram image corresponding to a location of the pupil, and may output an n-bit address corresponding to the received second coordinate value (u, v). In this regard, two bits from among the n-bit address may be used as a bit indicating a section. For example, an [n−1] bit which is the highest order bit and an [n−2] bit which is the second highest order bit may indicate a section to which the received second coordinate value (u, v) belongs.

The section to which the second coordinate value (u, v) belongs may be one of a plurality of predetermined sections. For example, the section to which the second coordinate value (u, v) belongs may be one of four sections. The section to which the second coordinate value (u, v) belongs may be determined according to a square ($u^2+v^2$) of a distance of the second coordinate value. In detail, an exemplary embodiment regarding the four sections to which the second coordinate value (u, v) may belong will be described later with reference to FIG. 10A. The address generator 910 according to an exemplary embodiment may obtain a square ($u^2+v^2$) of a distance of the second coordinate value from the obtained second coordinate value (u, v), and may determine to which of a plurality of (example: four) sections the obtained square ($u^2+v^2$) of the distance of the second coordinate value belongs in a current period.

A detailed embodiment of the address generator 910 will be described later with reference to FIG. 11.

The image data processing apparatus 100 according to an exemplary embodiment may obtain a focus term regarding the entire period even when, instead of data of the focus term regarding the entire period, only data of the focus term regarding a partial period is stored in the memory 120. For example, when a reference constant corresponding to the focus term regarding ¼ of the entire period is stored in the memory 120, the image data processing apparatus 100 may obtain the focus term regarding the entire period by updating the reference constant with the updater 920. Hereinafter, an operation of the updater 920 will be described.

The updater 920 according to an exemplary embodiment may update a reference constant obtained from the memory 120 according to a section to which an obtained coordinate value belongs. For example, the updater 920 may determine a focus term by updating a phase of a reference constant obtained from the memory 120 in a predetermined manner according to which of predetermined four sections the second coordinate value (u, v) obtained by the address generator 910 belongs. The memory 120 according to an exemplary embodiment may have stored a reference constant corresponding to each address as a lookup table therein.

For example, when the second coordinate value (u, v) belongs to a first section, a reference constant may be determined as a focus term as-is without being updated.

As another example, when the second coordinate value (u, v) belongs to a second section, a phase of a reference constant may be updated by 90° and determined as a focus term. For example, when a reference constant is A+jB, the updater 920 may determine −B+jA as a focus term.

As another example, when the second coordinate value (u, v) belongs to a third section, a phase of a reference constant may be updated by 180° and determined as a focus term. For example, when a reference constant is A+jB, the updater 920 may determine −A−jB as a focus term.

As another example, when the second coordinate value (u, v) belongs to a fourth section, a phase of a reference constant may be updated by 270° and determined as a focus term. For example, when a reference constant is A+jB, the updater 920 may determine B−jA as a focus term.

The reference constant may include a constant, from among a plurality of constants stored in the memory 120 within which data regarding a portion of the entire period of the focus term is stored, corresponding to the second coordinate value (u, v). For example, the reference constant may be a constant, from among constants that may be the focus term within ¼ of the period of the focus term, corresponding to the second coordinate value (u, v). In this case, the same reference constant may correspond to four different second coordinate values (u, v). A detailed embodiment of the reference constant will be described later with reference to FIG. 10B.

Figure 10A:
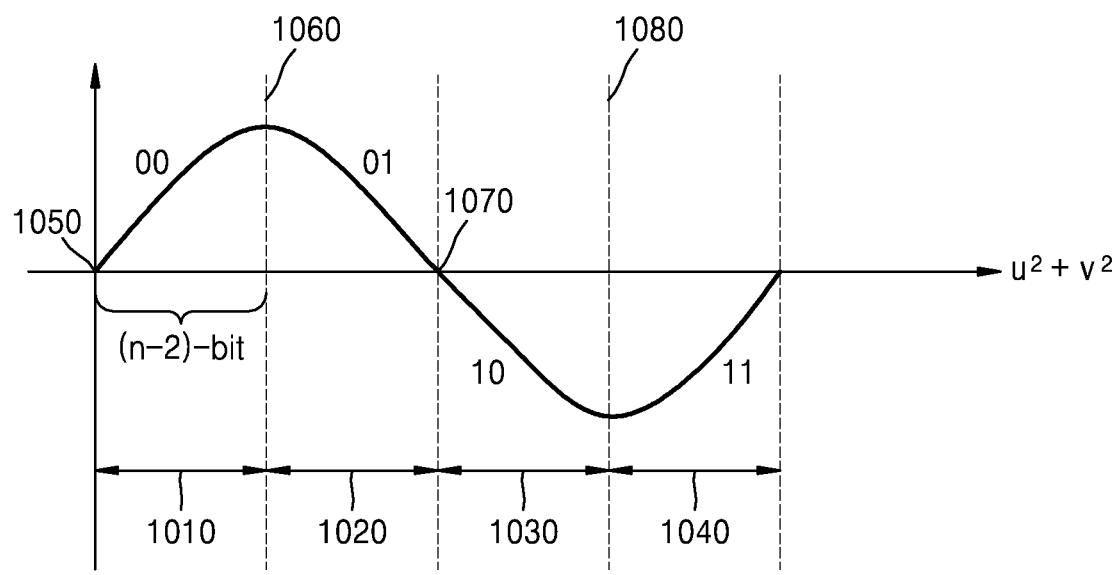
FIG. 10A illustrates periodicity of a focus term according to an exemplary embodiment that is used in a process of processing image data via the image data processing apparatus according to an exemplary embodiment.

FIG. 10A illustrates periodicity of a focus term according to an exemplary embodiment that is used in a process of processing image data via the image data processing apparatus 100 according to an exemplary embodiment.

A change of the focus term according to a change in a square ($u^2+v^2$) of a distance of a second coordinate value may be repeated every predetermined period. FIG. 10A illustrates a change of a real number or imaginary number of the focus term according to a change in the square ($u^2+v^2$) of the distance of the second coordinate value, according to an exemplary embodiment. Hereinafter, for convenience of description, descriptions will be made based on the assumption that the vertical axis denotes the real number of the focus term.

The vertical axis may denote the real number of the focus term, and the horizontal axis may denote the square ($u^2+v^2$) of the distance of the second coordinate value. The real number of the focus term or the square ($u^2+v^2$) of the distance of the second coordinate value at a first point 1050 where the horizontal axis and the vertical axis meet each other may be a predetermined value. For example, the real number of the focus term or the square ($u^2+v^2$) of the distance of the second coordinate value at the first point 1050 where the horizontal axis and the vertical axis meet each other may be a constant other than 0.

One period of the focus term according to an exemplary embodiment may be divided into four sections. For example, one period of the focus term may include a first section 1010, a second section 1020, a third section 1030, and a fourth section 1040.

Also, a change of the real number of the focus term according to a change in the square ($u^2+v^2$) of the distance of the second coordinate value may be sinusoidal. Accordingly, the real number of the focus term in the first section 1010 and the focus term in the second section 1020 may be symmetric with respect to a first axis 1060. Alternatively, the real number of the focus term in the second section 1020 and the focus term in the third section 1030 may be symmetric with respect to a second point 1070. Alternatively, the real number of the focus term in the third section 1030 and the focus term in the fourth section 1040 may be symmetric with respect to a second axis 1080.

Figure 10B:
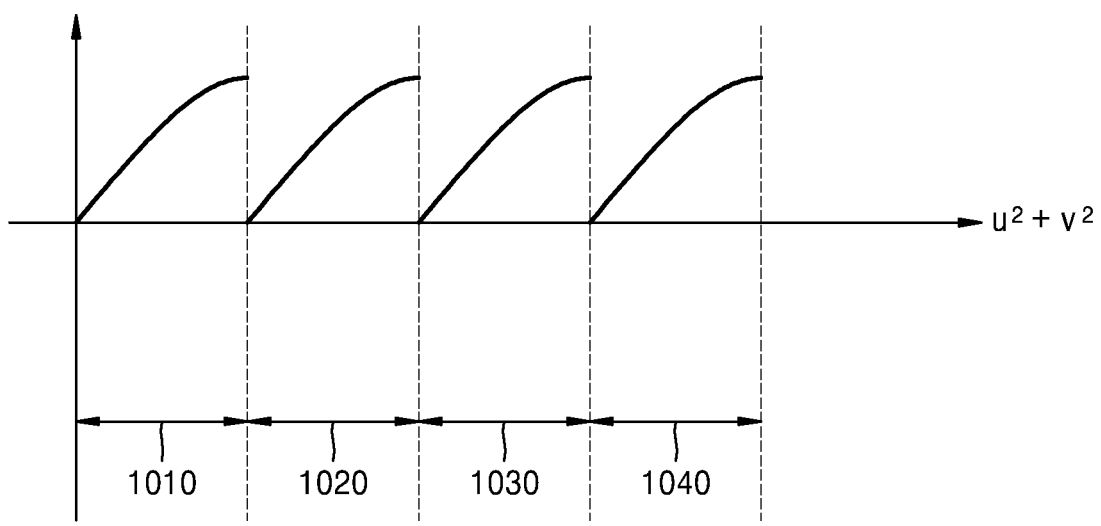
FIG. 10B illustrates periodicity of a reference constant according to an exemplary embodiment that is used in a process of processing image data via the image data processing apparatus according to an exemplary embodiment.

FIG. 10B illustrates periodicity of a reference constant according to an exemplary embodiment that is used in a process of processing image data via the image data processing apparatus 100 according to an exemplary embodiment.

The reference constant may include a constant, from among constants obtained with only a value regarding a portion of the entire period of a focus term, corresponding to a second coordinate value (u, v). For example, a function indicating the reference constant may be a function having ¼ of the period of the focus term as a period, in which a value within ¼ of the period of the focus term is repeated according to a change in a square ($u^2+v^2$) of a distance of a second coordinate value.

A change of the reference constant according to a change in the square ($u^2+v^2$) of the distance of the second coordinate value may be repeated every predetermined period. FIG. 10B illustrates a change of a real number or imaginary number of the reference constant according to a change in the square ($u^2+v^2$) of the distance of the second coordinate value, according to an exemplary embodiment. Hereinafter, for convenience of description, descriptions will be made based on the assumption that the vertical axis denotes the real number of the reference constant.

The vertical axis may denote the real number of the reference constant, and the horizontal axis may denote the square ($u^2+v^2$) of the distance of the second coordinate value. The real number of the reference constant or the square ($u^2+v^2$) of the distance of the second coordinate value at a point where the horizontal axis and the vertical axis meet each other may be a predetermined value. For example, the real number of the reference constant or the square ($u^2+v^2$) of the distance of the second coordinate value at the point where the horizontal axis and the vertical axis meet each other may be a constant other than 0.

One period of the focus term according to an exemplary embodiment may be divided into four sections. For example, one period of the focus term may include the first section 1010, the second section 1020, the third section 1030, and the fourth section 1040.

Also, a change of the real number of the reference constant according to a change in the square ($u^2+v^2$) of the distance of the second coordinate value may be repeated with respect to the four sections. Accordingly, a period of the reference constant may be ¼ of that of the focus term.

Although a case in which one period of a focus term is divided into four sections has been described with reference to FIGS. 10A and 10B, exemplary embodiments are not limited thereto. The image data processing apparatus 100 according to an exemplary embodiment may obtain a focus term by updating a phase of a reference constant by a predetermined value. For example, the image data processing apparatus 100 according to an exemplary embodiment may obtain a focus term by updating a phase of a reference constant by a value of 45°, 60°, 90°, 120°, 135°, 180°, 270°, etc.

The embodiment of FIG. 9 described above may be used to obtain a focus term by updating a phase of a reference constant by a multiple of 90°. When a focus term is obtained by updating a phase of a reference constant by a value other than the multiple of 90°, the image data processing apparatus 100 according to an exemplary embodiment may use a phase updating algorithm. The phase updating algorithm may refer to a method of obtaining, via phase updating, a value regarding the entire section of a periodic function by using only information regarding a partial section of the periodic function. For example, the image data processing apparatus 100 according to an exemplary embodiment may obtain a focus term by applying a change accompanied by updating a phase of a reference constant by X° to the reference constant, according to the phase updating algorithm. The phase updating algorithm according to an exemplary embodiment may include a method of mutually transforming coordinate values between values having the same absolute value but different phases on a complex plane.

Figure 11:
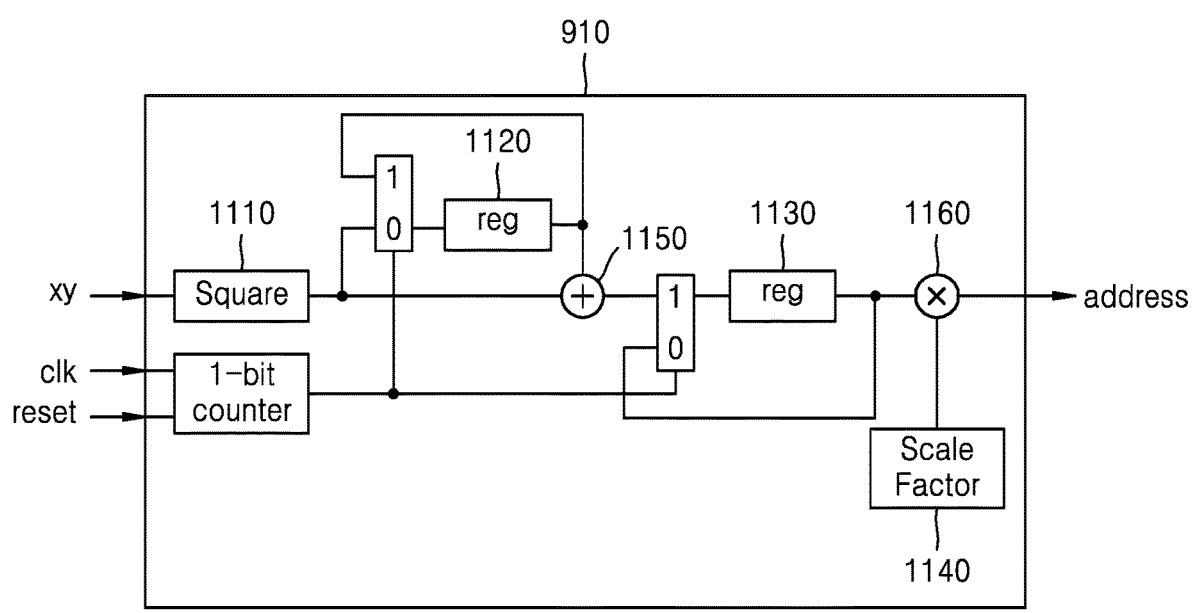
FIG. 11 is a block diagram of an exemplary embodiment of an address generator included in the image data processing apparatus according to an exemplary embodiment.

FIG. 11 is a block diagram of an exemplary embodiment of the address generator 910 included in the image data processing apparatus 100 according to an exemplary embodiment.

The address generator 910 according to an exemplary embodiment may receive a coordinate value, a clock, a reset, etc. and output an address. For example, the address generator 910 may output an n-bit address corresponding to a received coordinate value. The address generator 910 according to an exemplary embodiment may receive a second coordinate value (u, v) which is a coordinate value of a hologram image corresponding to a location of the pupil, and may output an n-bit address corresponding to the received second coordinate value (u, v). In this regard, two bits from among the n-bit address may be used as a bit indicating a section. For example, an [n−1] bit which is the highest order bit and an [n−2] bit which is the second highest order bit may indicate a section which the received second coordinate value (u, v) belongs to.

When u is applied, a first operator 1110 according to an exemplary embodiment may obtain $u^2$ by squaring u. Alternatively, when v is applied, the first operator 1110 may obtain $v^2$ by squaring v.

A first register 1120 according to an exemplary embodiment may store a value obtained from the first operator 1110.

A second operator 1150 according to an exemplary embodiment may perform an operation with respect to two or more values. For example, the second operator 1150 may output a value obtained by adding up a value stored in the first register 1120 and a value obtained from the first operator 1110.

A second register 1130 according to an exemplary embodiment may store a value obtained from the second operator 1150. For example, the second register 1130 may have stored $u^2+v^2$ therein.

A scale factor 1140 according to an exemplary embodiment may output a value to be scaled.

A third operator 1160 according to an exemplary embodiment may perform an operation with respect to two or more values. For example, the third operator 1160 may output a value obtained by multiplying a value stored in the second register 1130 and a value obtained from the second operator 1150.

An address outputted from the address generator 910 may be an output value from the third operator 1160, or may be a value obtained by making a predetermined change to an output value from the third operator 1160. For example, the address operator 910 may be a bitstream indicating an address of the memory 120 corresponding to an output value from the third operator 1160.

[Equation 5] shows a method of determining an address according to an exemplary embodiment.

$$\text{address}[MSB:LSB]=(u^2+v^2)\times(\text{scale factor}) \qquad \text{[Equation 5]}$$

As seen in [Equation 5], an address may be obtained via an operation at the third operator 1160.

Figure 12:
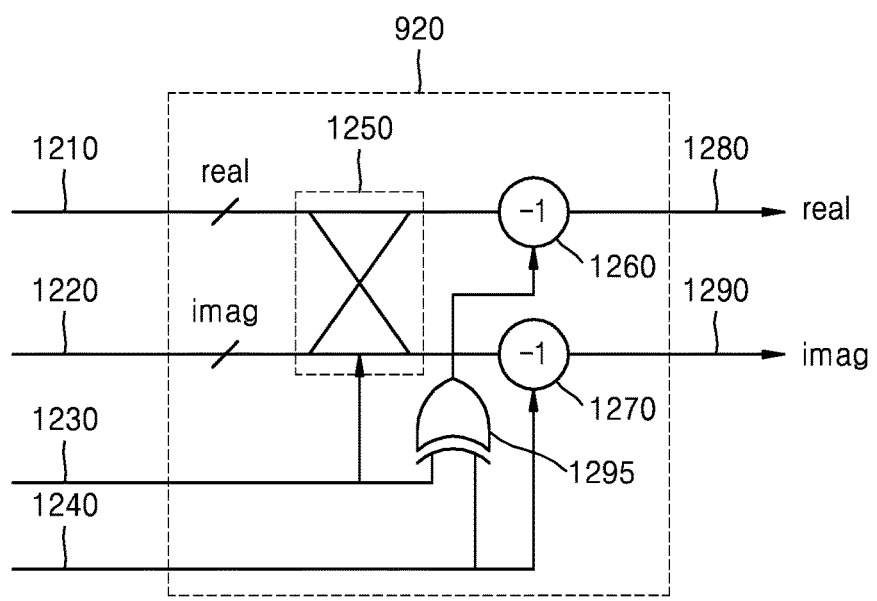
FIG. 12 illustrates an exemplary embodiment of an updater included in the image data processing apparatus according to an exemplary embodiment and obtaining a focus term from a reference constant.

FIG. 12 illustrates an exemplary embodiment of the updater 920 included in the image data processing apparatus 100 according to an exemplary embodiment and obtaining a focus term from a reference constant. Also, an update table 1200 shows a method of obtaining a focus term from a reference constant via the image data processing apparatus 100, according to an exemplary embodiment.

The updater 920 according to an exemplary embodiment may receive a real number of a reference constant from the memory 120 via a first line 1210.

The updater 920 according to an exemplary embodiment may receive an imaginary number of a reference constant from the memory 120 via a second line 1220.

The updater 920 according to an exemplary embodiment may receive a second highest order bit [n−2] of an address from the address generator 910 via a third line 1230.

The updater 920 according to an exemplary embodiment may receive a highest order bit [n−1] of an address from the address generator 910 via a fourth line 1240.

A first operator 1250 according to an exemplary embodiment may determine whether to transmit a value received via the first line 1210 to a second operator 1260 or a third operator 1270 according to a bit received via the third line 1230.

The first operator 1250 according to an exemplary embodiment may determine whether to transmit a value received via the second line 1220 to the second operator 1260 or the third operator 1270 according to a bit received via the third line 1230.

The second operator 1260 according to an exemplary embodiment determines whether to change a sign of a value obtained from the first operator 1250 according to a bit received from a fourth operator 1295.

The third operator 1270 according to an exemplary embodiment determines whether to change a sign of a value obtained from the first operator 1250 according to a bit received from the fourth line 1240.

A fifth line 1280 according to an exemplary embodiment may output a value obtained from the second operator 1260. A value outputted from the fifth line 1280 may be a real number 1205 of a focus term.

A sixth line 1290 according to an exemplary embodiment may output a value obtained from the third operator 1270. A value outputted from the sixth line 1290 may be an imaginary number 1206 of a focus term.

The update table 1200 shows an operation of the updater 920 according to an exemplary embodiment. In detail, according to which section from among a first section 1201, a second section 1202, a third section 1203, and a fourth section 1204 an obtained square $(u^2+v^2)$ of a distance of a second coordinate value belongs to, a method of determining high order 2 bits of an address and a method of determining a focus term by changing a reference constant obtained from the memory 120 are illustrated.

The high order 2 bits of an address according to an exemplary embodiment may be 00 when the square $(u^2+v^2)$ of a distance of a second coordinate value is in the first section 1201, may be 01 when the square $(u^2+v^2)$ of a distance of a second coordinate value is in the second section 1202, may be 10 when the square $(u^2+v^2)$ of a distance of a second coordinate value is in the third section 1203, and may be 11 when the square $(u^2+v^2)$ of a distance of a second coordinate value is in the fourth section 1204.

Also, when the square $(u^2+v^2)$ of a distance of a second coordinate value belongs to the first section 1201, the updater 920 according to an exemplary embodiment may determine a reference constant as a focus term as-is without updating the reference constant.

Alternatively, when the square $(u^2+v^2)$ of a distance of a second coordinate value belongs to the second section 1202, the updater 920 according to an exemplary embodiment may determine a value obtained by changing a sign of an imaginary number of a reference constant as a real number of a focus term, and may determine a real number of the reference constant as an imaginary number of the focus term.

Alternatively, when the square $(u^2+v^2)$ of a distance of a second coordinate value belongs to the third section 1203, the updater 920 according to an exemplary embodiment may determine a value obtained by changing a sign of a real number of a reference constant as a real number of a focus term, and may determine a value obtained by changing a sign of an imaginary number of the reference constant as an imaginary number of the focus term.

Alternatively, when the square $(u^2+v^2)$ of a distance of a second coordinate value belongs to the fourth section 1204, the updater 920 according to an exemplary embodiment may determine an imaginary number of a reference constant as a real number of a focus term, and may determine a value obtained by changing a sign of a real number of the reference constant as an imaginary number of the focus term.

Figure 13:
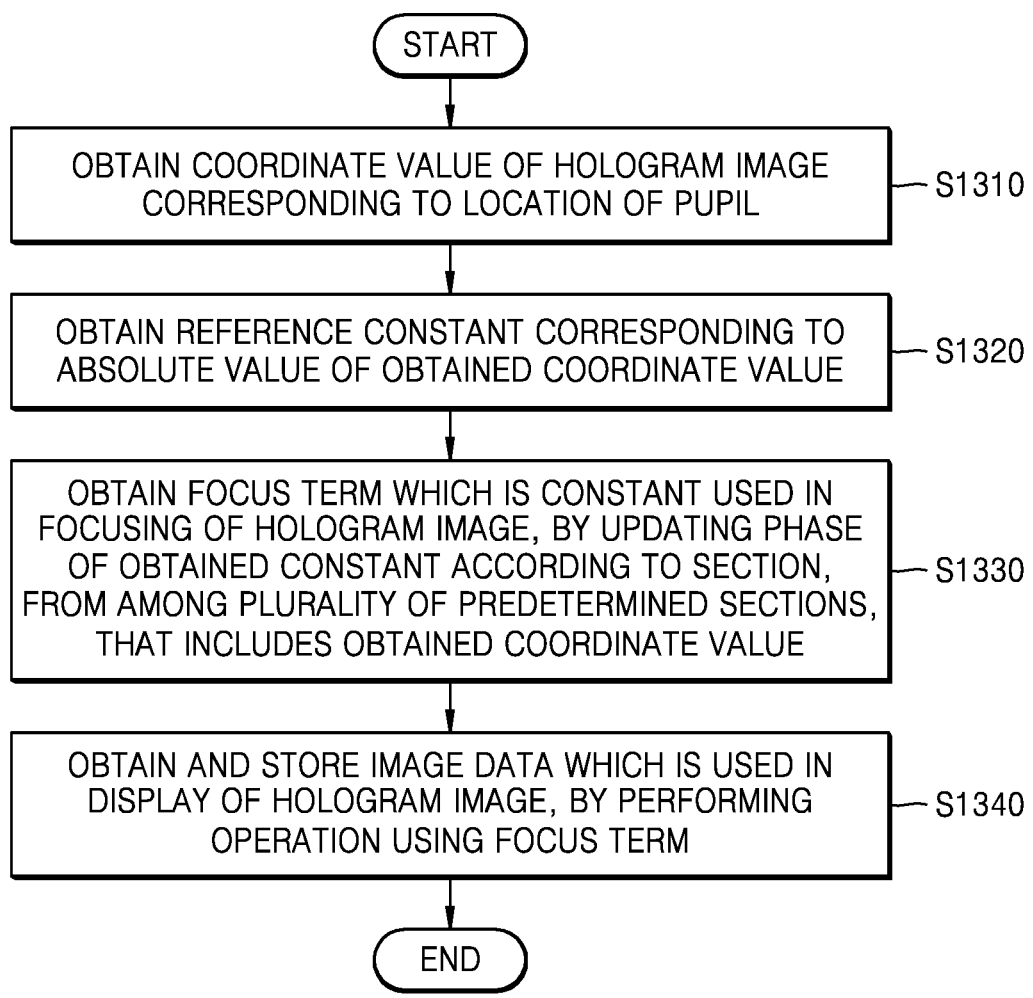
FIG. 13 is a flowchart of a method of processing image data via the image data processing apparatus according to an exemplary embodiment.

FIG. 13 is a flowchart of a method of processing image data via the image data processing apparatus 100 according to an exemplary embodiment.

In operation S1310, the image data processing apparatus 100 according to an exemplary embodiment obtains a second coordinate value (u, v) which is a coordinate value of a hologram image corresponding to a location of the pupil.

In operation S1320, the image data processing apparatus 100 according to an exemplary embodiment obtains a reference constant which is a constant corresponding to the second coordinate value (u, v) obtained in operation S1310 or a square $(u^2+v^2)$ of a distance of the second coordinate value from the origin.

A period of the reference constant according to a change in the square $(u^2+v^2)$ of the distance of the second coordinate value from the origin may be shorter than that of a focus term according to the change in the square $(u^2+v^2)$ of the distance of the second coordinate value from the origin. For example, a period of the reference constant may be ¼ of that of the focus term.

The image data processing apparatus 100 according to an exemplary embodiment may determine an address in which the reference constant is stored, according to the coordinate value, and may obtain the reference constant by loading data recorded on the address from the memory 120. For example, the image data processing apparatus 100 may obtain an address corresponding to the square $(u^2+v^2)$ of the distance of the second coordinate value from the origin, and may load data recorded on the obtained address from the memory 120 and determine a loaded value as the reference constant. A bitstream indicating the address may include a plurality of bits indicating a section including the obtained coordinate value. The image data processing apparatus 100 may determine the reference constant by using only a bit except the plurality of bits indicating the section including the obtained coordinate value from among the bitstream indicating the address. The plurality of bits indicating the section including the obtained coordinate value may be two, and may be high order 2 bits from among the bitstream indicating the address.

In operation S1330, the image data processing apparatus 100 according to an exemplary embodiment obtains a focus term which is a constant used in focusing of the hologram image, by updating a phase of the reference constant according to a section, from among a plurality of predetermined sections, determined according to the obtained coordinate value.

A section determined by the second coordinate value (u, v) or a section including the square $(u^2+v^2)$ of the distance of the second coordinate value from the origin may indicate a quadrant including a focus term corresponding to the square $(u^2+v^2)$ of the distance of the second coordinate value from the origin on two-dimensional coordinates. For example, in a case where the horizontal axis is put as a real number, and the vertical axis is put as an imaginary number, a section may be determined according to which of the first to fourth quadrants is a quadrant where $e^{i\theta}$ ($\theta=c(u^2+v^2)$, $$c = -\frac{\pi}{\lambda}\left(\frac{1}{d_1} + \frac{1}{d_2} - \frac{1}{f}\right))$$

is located. Alternatively, a section may be determined as described above with reference to FIGS. 10A and 10B.

In operation S1340, the image data processing apparatus 100 according to an exemplary embodiment obtains image data which is used in display of the hologram image, by performing an operation using the focus term and stores the image data.

The image data processing apparatus 100 according to an exemplary embodiment may display the hologram image by using the image data obtained or stored in operation S1340.

Figure 14:
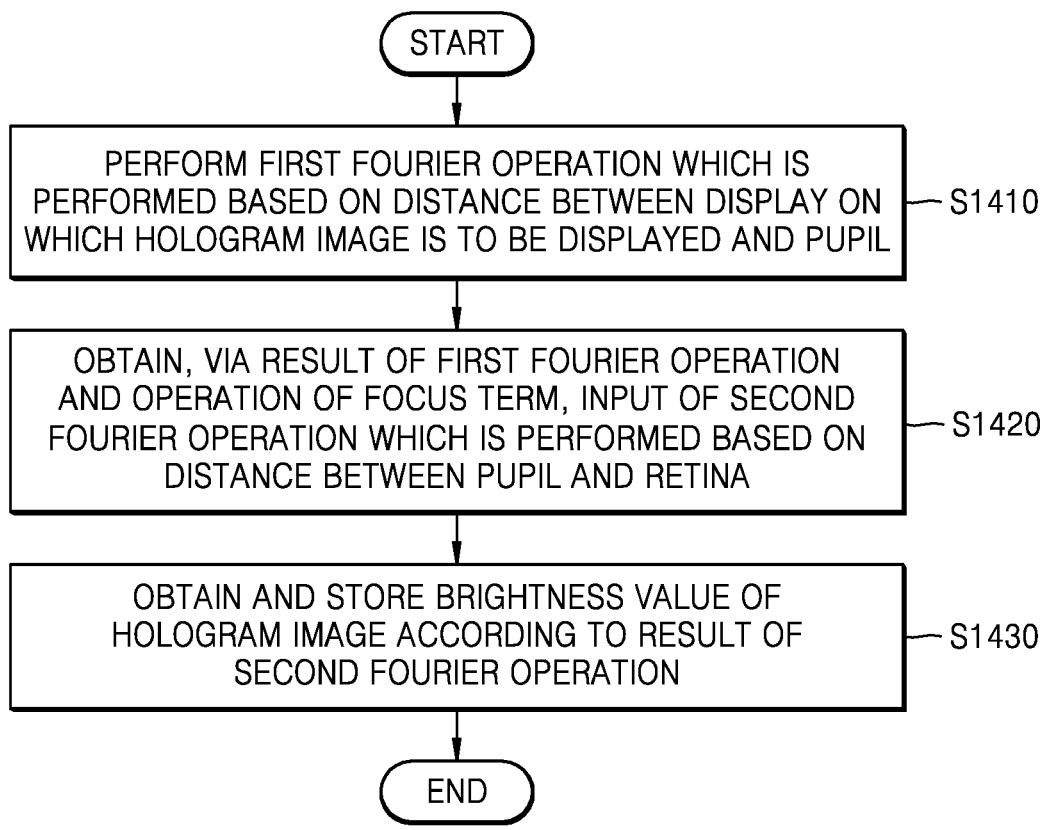
FIG. 14 is a flowchart of a method of processing image data via the image data processing apparatus according to an exemplary embodiment by performing a Fourier operation using a focus term.

FIG. 14 is a flowchart of a method of processing image data via the image data processing apparatus 100 according to an exemplary embodiment by performing a Fourier operation using a focus term.

In operation S1410, the image data processing apparatus 100 according to an exemplary embodiment performs a first Fourier transform which is performed based on a distance between a display on which a hologram image is to be displayed and the pupil.

In operation S1420, the image data processing apparatus 100 according to an exemplary embodiment obtains, via a result of the first Fourier transform and an operation of the focus term, an input of a second Fourier transform which is performed based on a distance between the pupil and the retina. In detail, an example in which an operation using the focus term is performed may be understood by referring to [Equation 2] described above.

In operation S1430, the image data processing apparatus 100 according to an exemplary embodiment obtains a brightness value of the hologram image according to a result of the second Fourier transform and stores the brightness value of the hologram image. Also, when the image data processing apparatus 100 includes the display 130, the image data processing apparatus 100 may display the obtained or stored brightness value.

The apparatuses described herein may include a processor, a memory for storing and executing program data, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or digital versatile discs (DVDs)). The computer readable recording medium can also be distributed over network coupled computer systems so that the computer readable code is stored and executed in a distributive manner. This media can be read by the computer, stored in the memory, and executed by the processor.

The present exemplary embodiments may be described in terms of functional block components and various processing operations. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, processes, routines or other programming elements. Functional aspects may be implemented in algorithms that are executed on one or more processors. Also, the present embodiments could employ any number of conventional techniques for electronics configuration, signal processing and/or control, data processing and the like. The words "mechanism," "element," "means," and "configuration" may be used broadly and are not limited to mechanical or physical example embodiments, but can include software routines in conjunction with processors, etc.

The particular implementations shown and described herein are illustrative examples and are not intended to otherwise limit the technical scope in any way. For the sake of brevity, conventional electronics, control systems, software development and other functional aspects of the systems may not be described in detail. Also, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a", "an" and "the" and similar referents in the present specification (especially in the following claims) are to be construed as covering both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein can be performed in any suitable order unless otherwise indicated herein or otherwise clearly contradicted by context. The inventive concept is not limited to the described order of the operations. The use of any and all examples, or exemplary language (e.g., "such as") provided herein, is intended merely to better illuminate the inventive concept and does not pose a limitation on the scope of the inventive concept unless otherwise claimed. Numerous modifications, combinations, and adaptations will be readily apparent to one of ordinary skill in the art without departing from the spirit and scope.

What is claimed is:

1. An image data processing method comprising:
   obtaining a coordinate value of a pixel on a hologram image, wherein the coordinate value corresponds to a location of a pupil relative to a display, on which the hologram image is to be displayed;
   obtaining a reference constant which corresponds to the coordinate value, from among a plurality of constants pre-stored as candidate values of a focus term for focusing the hologram image on the display;
   obtaining the focus term by updating a phase of the reference constant according to a section, from among a plurality of predetermined sections constituting one periodic pattern of the focus term, the section comprising a square of a distance of the coordinate value relative to the display, wherein the phase of the reference constant is updated by a different value according to each section of the plurality of predetermined sections;

obtaining image data by performing a mathematical operation using the focus term, and storing the image data; and displaying, on the display, the hologram image by using stored image data.

2. The method of claim 1, wherein a period of the reference constant, according to a change in the square of the distance of the coordinate value from an origin, is shorter than one period of the focus term, according to the change in the square of the distance of the coordinate value from the origin.

3. The method of claim 1,
wherein the obtaining the image data comprises:
performing a first Fourier operation based on a distance between the display on which the hologram image is to be displayed and the pupil;
performing a second Fourier operation based on a distance between the pupil and retina, by using, as an input of the second Fourier operation, a result of a mathematical operation on a result of the first Fourier operation and the focus term; and
obtaining a brightness value of the hologram image based on a result of the second Fourier operation; and
wherein the storing the image data comprises storing the brightness value of the hologram image.

4. The method of claim 1, wherein the section comprising the coordinate value is a quadrant comprising the focus term, among four quadrants divided by an X axis and a Y axis, wherein the focus term corresponds to the square of the distance of the coordinate value from an origin on two-dimensional coordinates.

5. The method of claim 1, wherein the obtaining the reference constant comprises:
determining an address in which the reference constant is stored, according to the coordinate value; and
obtaining the reference constant by loading data recorded on the address from a memory.

6. The method of claim 5, wherein a bitstream indicating the address comprises a plurality of bits indicating the section comprising the coordinate value, and
the obtaining the reference constant by loading the data recorded on the address from the memory comprises obtaining the reference constant by using a bit not included in the bitstream.

7. The method of claim 6, wherein the plurality of bits indicating the address comprises high order 2 bits of the bitstream.

8. The method of claim 1, wherein the obtaining the focus term comprises updating the phase of the reference constant by a predetermined value.

9. The method of claim 8, wherein the predetermined value comprises at least one of 90°, 180°, and 270°.

10. An image data processing apparatus comprising:
a display;
a memory configured to store image data and software; and
a processor configured to execute the software and configured to operate as instructed by the software to:
obtain a coordinate value of a pixel on a hologram image, wherein the coordinate value corresponds to a location of a pupil relative to the display, on which the hologram image is to be displayed,
obtain a reference constant which is a constant corresponding to the coordinate value, from among a plurality of constants pre-stored as candidate values of a focus term for focusing the hologram image on the display,
obtain the focus term by updating a phase of the reference constant according to a section, from among a plurality of predetermined sections constituting one periodic pattern of the focus term, the section comprising a square of a distance of the coordinate value relative to the display, wherein the phase of the reference constant is updated by a different value according to each section of the plurality of predetermined sections
obtain the image data by performing a mathematical operation using the focus term; and
control the display to display the hologram image using the image data stored in the memory.

11. The apparatus of claim 10, wherein a period of the reference constant, according to a change in the square of the distance of the coordinate value from an origin, is shorter than one period of the focus term according to the change in the square of the distance of the coordinate value from the origin.

12. The apparatus of claim 10, wherein the processor is further configured to:
perform a first Fourier operation based on a distance between the display on which the hologram image is to be displayed and the pupil,
perform a second Fourier operation based on a distance between the pupil and retina, by using, as an input of the second Fourier operation, a result of a mathematical operation on a result of the first Fourier operation and the focus term, and
obtain a brightness value of the hologram image based on a result of the second Fourier operation.

13. The apparatus of claim 10, wherein the section comprising the coordinate value is a quadrant comprising the focus term, among four quadrants divided by an X axis and a Y axis, wherein the focus term corresponds to the square of the distance of the coordinate value from an origin on two-dimensional coordinates.

14. The apparatus of claim 10, wherein the processor is further configured to determine an address in which the reference constant is stored, according to the coordinate value, and to obtain the reference constant by loading data recorded on the address from the memory.

15. The apparatus of claim 14, wherein a bitstream indicating the address comprises a plurality of bits indicating the section comprising the coordinate value, and
the processor is further configured to obtain the reference constant by using a bit not included in the bitstream.

16. The apparatus of claim 15, wherein the plurality of bits indicating the address comprises high order 2 bits of the bitstream.

17. The apparatus of claim 15, wherein the memory is further configured to store a lookup table regarding data of the reference constant.

18. A non-transitory computer-readable recording medium having recorded thereon a program for performing a method comprising:
obtaining a coordinate value of a pixel on a hologram image, wherein the coordinate value corresponds to a location of a pupil relative to a display, on which the hologram image is to be displayed;

obtaining a reference constant which corresponds to the coordinate value, from among a plurality of constants pre-stored as candidate values of a focus term for focusing the hologram image on the display;

obtaining the focus term by updating a phase of the reference constant according to a section, from among a plurality of predetermined sections constituting one periodic pattern of the focus term, the section comprising a square of a distance of the coordinate value relative to the display, wherein the phase of the reference constant is updated by a different value according to each section of the plurality of predetermined sections; and obtaining image data by performing a mathematical operation using the focus term, and storing the image data; and displaying, on the display, the hologram image by using stored image data.

\* \* \* \* \*